Aug. 19, 1941. F. W. DODSON 2,252,759
TIRE CHAIN OR SIMILAR DEVICE
Filed May 16, 1939
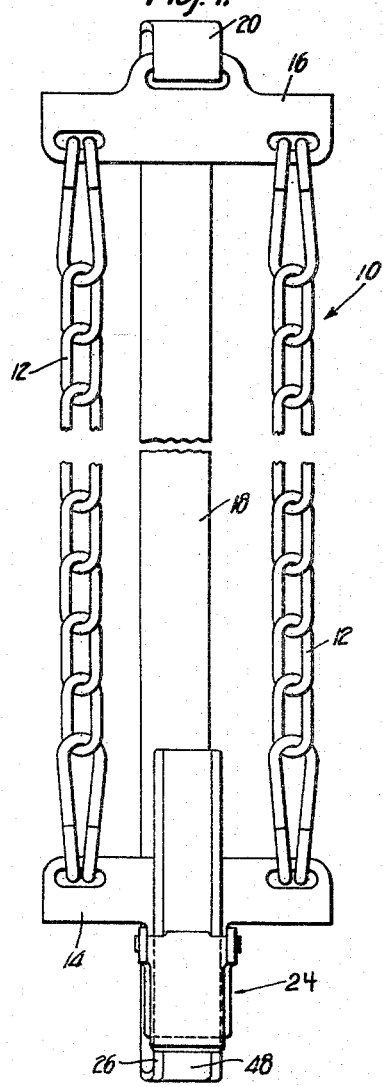
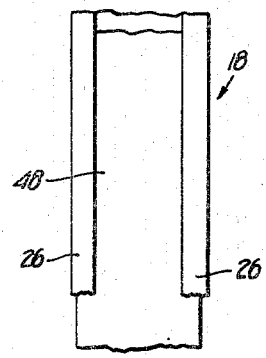
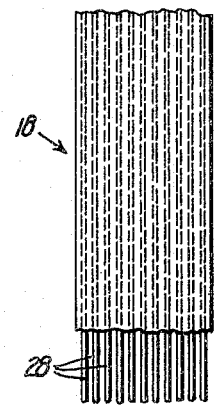
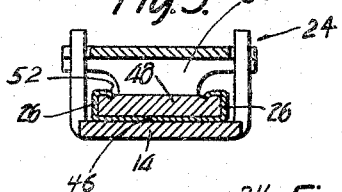
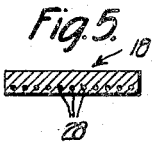
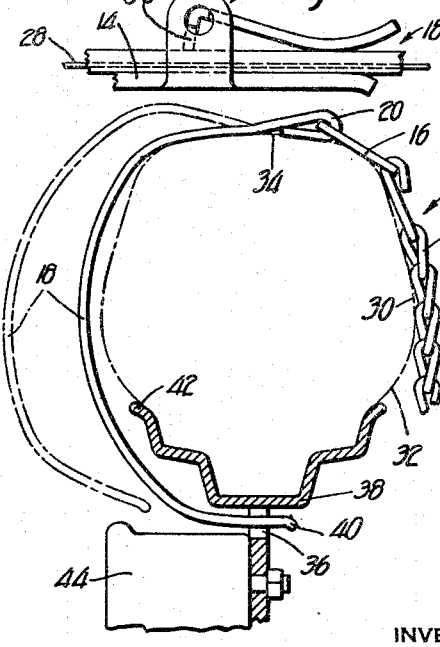
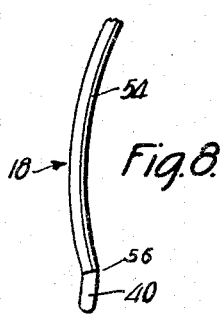
INVENTOR
Frederick W. Dodson.

Patented Aug. 19, 1941

2,252,759

UNITED STATES PATENT OFFICE 2,252,759

TIRE CHAIN OR SIMILAR DEVICE

Frederick W. Dodson, Madison, N. J.

Application May 16, 1939, Serial No. 273,833

12 Claims. (Cl. 152—213)

This invention relates to a tire chain and more particularly to the so-called emergency chains of the type having a strap which passes around the felly of the wheel between the spokes to hold the chain in place.

Tire chains of the above type have been in use for a number of years and could easily be applied to the wheel so long as the opening formed by adjacent spokes and the arc of the felly between the spokes, was large enough to permit a person's hand to pass through the opening and grasp the end of the strap and pull the strap through the opening to a position where the strap could be fastened to the usual catch or fastening means. However, in the wheels used on present day automobiles the opening between the adjacent spokes and felly is so small that it will not admit a person's hand and one of the objects of the present invention is to provide such a chain with a strap which can be made to come through the opening to a position where it can be grasped from the outside of the wheel. Another feature of the invention is a unitary construction for accomplishing the above object. A further feature of the invention is a chain and strap combination which requires no special tool or other separate device to apply the chain to the tire. Still another object of the invention is a chain and strap combination which is low in cost and which will not be injured during use.

These and other objects and features of the invention will be described and in part will be obvious from the following description and claims taken in conjunction with the accompanying drawing, in which Fig. 1 is a general view of the chain and strap assembly.

Fig. 2 is a plan view of one form of strap.

Fig. 3 is an end view of the strap of Fig. 2 showing the cooperation of this form of strap with the catch or fastening means.

Fig. 4 is a plan view of another form of strap.

Fig. 5 is an end view of the form of strap shown in Fig. 4.

Fig. 6 is a side view of the strap of Fig. 4 showing the cooperation of this form of strap with the catch or fastening means.

Fig. 7 is a section through a tire casing and a portion of the rim, spokes and brake drum of a wheel showing one of the ways in which the chain may be applied to a tire.

Fig. 8 is a side view of another form of strap.

For purposes of explaining the invention it will be described in connection with a simple form of tire chain and strap but it should be understood that the invention is not limited to these particular forms.

As will be seen from Fig. 1, the chain element designated generally at 10, comprises one or more link or tread or road engaging elements 12 and plate elements 14 and 16. To one of the plate elements, a strap element 18 may be disconnectably though preferably permanently fastened at one end 20 by suitable means, for instance rivets and the other end 22 is free so that it can be passed around the felly of a wheel between the spokes and adjustably and removably fastened to the other plate element by a fastening means 24 which may be for instance a buckle or catch or clasp. The plate elements may, so far as one aspect of this invention is concerned, be regarded merely as a means to connect the chain element with the strap element. However, as will appear later, the plate element provides protection for certain parts of the strap element.

The strap element may be of any suitable material from which straps are usually made but preferably is a heavy textile. The strap materials are provided with shape retaining means illustrated in Fig. 2 as a metal edging 26 and in Fig. 4 as wires 28. With the shape retaining means of the present invention, the straps can be formed on such a curve that when pushed from one side 30 of the tire 32 over the tread 34 of the tire, the free end of the strap can easily be made to come through the opening 36 in the wheel so that it can be grasped on the same side of the wheel from which it was started. For clarity in the drawing the metal edging and wires are shown much larger than they would normally have to be.

For this purpose the edging 26 or the wires 28 may be of flexible or pliable or ductile metal which may readily be bent into the desired shape by a person's hands and retain that shape until further deformed. Thus the strap may be given an arcuate shape before starting to push it around the tire and it will then automatically find its way around the tire 32 and felly 38 and, if operated properly, will come out of the said opening between the spokes. The tip 40 of the strap may also readily be bent for instance into a slight flare, to ride over obstructions such as the rim 42 of the wheel, when the strap is finding its way around the tire and felly. Also the strap may be bent by hand as it is fed around the tread of the tire, using the tire as a form. The end of the strap striking the brake mechanism 44 will assist in guiding the strap between the spokes. Thus only one size or type of strap need be used for tires of different diameters, as the form of the strap may easily be determined when applied to the tire. Also the strap may be bent to have a projecting end and a somewhat arcuate shape as shown in Fig. 7. The strap may be placed in an original position substantially as indicated in the dotted line position of Fig. 7 and then by simultaneously grasping the strap and tire and squeezing the two together the end of the strap will come through the opening between the spokes. Thus there are numerous ways of applying the chain to the tire.

The metal of the shape retaining means may be and preferably is a rust-proof and easily bent metal, for instance copper, zinc, lead, aluminum or suitable alloy. Preferably it should readily be bent by hand but yet should retain its shape while passing around the tire. Thus when the strap has encircled the tire and come out of the opening, the end portion of the strap may be bent to a suitable shape so that it properly cooperates with and does not interfere with the operation of the catch or fastening means 24. Also the strap and shape retaining means may have a slight springiness to hug the tire as the strap encircles it. The strap may for certain applications be of a preformed U shape and be springlike in its action, being for instance of rust-proofed steel or similar metal. It will also be understood that the strap may be entirely made of the shape retaining materials or the shape retaining means may be separate means and may be made separately for attachment to straps already in use.

In one form of the invention, particularly where the shape retaining means is of soft flexible shape retaining metal, the shape retaining means is preferably so placed on the strap that it is not injured or permanently bent by the fastening means 24. For this purpose the shape retaining means may be a metal strip 46 applied to the limp strap portion 48 so that when the strap is fastened in the fastening means, the metal lies next to and is supported and protected by the plate 14. In this way the strap engaging portion 50 of the fastening means 24 contacts only the limp portion 48 of the strap and does not deform the metal to any great extent, if at all. The metal strip may be held on the limp portion of the strap in any suitable manner, for instance by having the edges bent up and over the edges of the said limp portion to form the edging 26 which may have integral prongs 52 piercing the limp portion of the strap to hold the metal in place. The strap engaging portion 50 of the fastening means also may be arranged so that it does not contact and deform the edging. It is also within the comtemplation of this invention to use merely one or both of the edgings 26 as the shape retaining means, omitting the central portion of the metal strip.

If metal edgings or strips are not desired, or in addition to either or both the edging or strip 28, one or more wires may be applied to the limp strap material for instance by being woven or stitched into the material. The wires are preferably so placed that they are not substantially deformed or injured by the strap engaging portion 50 of the fastening means and to that end may lie near the bottom of the strap adjacent the plate 14, as shown in Figs. 5 and 6. Where wires are used, the central wires (or the outer wires) may be omitted and one or both outer wires (or the central wires) relied upon the shape retaining means. The metal of the wires may have the characteristics above noted with regard to the metal from which the strip or edging is made. Where the shape retaining means are not on the edge of the strap, the keeper 50 may extend entirely across the width of the strap without deforming the shape retaining means.

In the form of the invention shown in Fig. 8 a layer 54 of an elastic material, for instance rubber or a substitute may be applied to a face of the strap 18, the object being to hold the strap on such a curve that it will feel its way around the tire casing and come out of the opening in the wheel. The metal tip 40 is preferably used as previously described. Rubber strips or threads may be used instead of a solid layer 54 or the wires 28, in a protected position, or the strap material may be impregnated or coated with rubber. The rubber used is preferably a toughened product, for example a product such as is used in the manufacture of tires, so that the treated strap will normally hold its curved shape in much the same way that the usual automobile tire holds its shape, yet the strap can be straightened out against the plate 14 without substantial injury. To make such a strap, a preformed and cured piece of rubber may be cemented or otherwise fastened to the strap (either before or after the forming and curing) or the strap material may be treated with the desired rubber composition and cured into the desired shape. If desired, the rubber may be used in conjunction with the previously described metal edging and/or wires, the metal retaining substantially the shape to which it is bent and the rubber giving the combination in a resilient yield. In this instance the rubber and metal may extend to the end of the strap. Also the metal may stop short of the strap end providing a flexible rubberized end so that the end will easily ride over the rim 42 and then find its way between the spokes, particularly in the previously described manners of applying the strap to the tire wherein the end of the strap is spring pressed against the tire and where the strap is molded around the tire either before or during application of the strap. It is also contemplated to make the strap with the metal applied only to the leading portion and rubberized material on the other portion. In each case the rubber may be replaced by the hereinbefore described springy metal and the result of the springy effect is that there is a strap end of substantial length which is urged into the opening between the spokes, either because of its own springiness or that of the main body of the strap or both. The strap end may extend for an inch or so back from the tip for instance substantially one-half, more or less, of the horizontal diameter of the tire so that as the body of the strap moves inward from the tread of the tire to the rim of the wheel the end of the strap follows the contour and will spring through the opening as soon as possible. In this construction it is somewhat as though the end of the strap were hinged at point 56, and folded toward the body of the strap which position is substantially maintained until the strap end can move outwardly and enter the opening.

Although the composite strap may be round or have any other shape, it is preferred that the strap have little or no side movement and the form of strap with a flat cross section is thus preferred. The form of strap which has sufficient rigidity crosswise to be entirely self-supporting in an extended horizontal position is particularly useful in applying the chain to a tire where there is little clearance between the tire and fender; for instance the strap may be bent into the design shown in Fig. 7, then held substantially parallel with the tire tread and moved from the outside to the inside of the tire and then rotated to the dotted line position shown in Fig. 7. Also when the strap is applied to the tire in any other way, the cross rigidity will enable the free end of the strap to be moved to a wheel opening in case it is not fed directly into the opening.

From the above description it will be seen that a unitary device has been provided which requires no tools in order to apply the chain to the tire. There is thus no tool to become lost and the chain is always ready for immediate application. Also the parts of the strap which may be injured during use and which, if injured, may prevent the easy and proper functioning of the device are protected. It is recognized that many forms and modifications of the device herein used to illustrate the invention, may be made, for instance the plates may be smaller or larger to accommodate only one or more than the two link elements shown, other forms of fastening devices may be used as well as other forms of shape retaining means, and the link elements may be rubber, rope, pads or any other suitable material or shape; other modifications within the spirit of the invention will readily suggest themselves to those skilled in the art, and it is therefore desired that the invention be construed as broadly as the claims taken in conjunction with the prior art, may allow.

I claim:

1. In a tire chain the combination of a road engaging element and a strap element adapted to hold the first element on the tire and shape retaining means applied to the strap element and adapted to hold the strap element in a given shape.

2. In a tire chain the combination of a road engaging element and a strap element adapted to hold the first element on the tire, said strap element embodying resilient shape retaining means.

3. In a tire chain the combination of a road engaging element and a strap element adapted to hold the first element on the tire, a strap supporting element, fastening means to fasten the road engaging element to the strap element, and shape retaining means applied to the strap element and positioned to be protected from said fastening means.

4. In a tire chain the combination of a road engaging element and a strap element adapted to hold the first element on the tire, said strap element embodying shape retaining means at least a portion of which is deformable by a person's hands.

5. In a tire chain the combination of a road engaging element and a strap element adapted to hold the first element on the tire, said strap element embodying shape retaining means including a yieldable metal member.

6. In a tire chain the combination of a road engaging element and a strap element adapted to hold the first element on the tire, said strap element having a body member and a tip member and embodying shape retaining means, and a flexible connection between said members.

7. In a tire chain the combination of a road engaging element and a strap element adapted to hold the first element on the tire and shape retaining means along an edge of the strap element.

8. In a tire chain the combination of a road engaging element and a strap element adapted to hold the first element on the tire, said strap element embodying within it shape retaining means.

9. In a tire chain the combination of a road engaging element and a strap element adapted to hold the first element on the tire, said strap element embodying shape retaining means including wires.

10. In a tire chain the combination of a road engaging element and a strap element adapted to hold the first element on the tire, said strap element embodying shape retaining means of a plastic material.

11. In a tire chain the combination of a road engaging element and a strap element adapted to hold the first element on the tire, said strap element comprising a body member and a tip member and embodying shape retaining means at least one of said members being springy.

12. In a tire chain the combination of a road engaging element and a strap element adapted to hold the first element on the tire, said strap element embodying metallic shape retaining means.

FREDERICK W. DODSON.